United States Patent [19]

Kawaguchi et al.

[11] Patent Number: 5,775,094
[45] Date of Patent: Jul. 7, 1998

[54] APPARATUS AND METHOD FOR CONTROLLING THRUSTER VALVE

[75] Inventors: Junichiro Kawaguchi; Tatsuaki Hashimoto; Yasuhiro Morita, all of Sagamihara, Japan

[73] Assignee: The Director-General of the Institute of Space and Astronautical Science, Sagamihara, Japan

[21] Appl. No.: 698,083

[22] Filed: Aug. 15, 1996

[30] Foreign Application Priority Data

Feb. 21, 1996 [JP] Japan .................... 8-033652

[51] Int. Cl.⁶ .................................................. F02K 9/58
[52] U.S. Cl. .................................. 60/204; 60/233
[58] Field of Search ................... 60/200.1, 201, 60/204, 227, 233

[56] References Cited

U.S. PATENT DOCUMENTS

| | | | |
|---|---|---|---|
| 3,105,671 | 10/1963 | Teitelbaum et al. | 60/200.1 |
| 3,304,723 | 2/1967 | Gaura | 60/233 |
| 3,330,114 | 7/1967 | McQueen | 60/200.1 |
| 5,271,226 | 12/1993 | Stone | 60/233 |

*Primary Examiner*—Louis J. Casaregola
*Attorney, Agent, or Firm*—Oblon, Spivak, McClelland, Maier & Neustadt, P.C.

[57] ABSTRACT

When the operation of an electromagnetic thruster valve disposed in a fluid passage for establishing the connection between a gas tank and a thruster unit for jetting gas filled in the gas tank is controlled to follow a thrust command, rise time of thrust at certain thrust is measured based on a state of the operation of the electromagnetic thruster valve. Then, the measured value and a predetermined delay value are subject to a comparison. The obtained difference is used as previous delay time to correct delay time of operation control of the electromagnetic thruster valve with respect to a next thrust command when the operation of the electromagnetic valve is controlled.

3 Claims, 4 Drawing Sheets

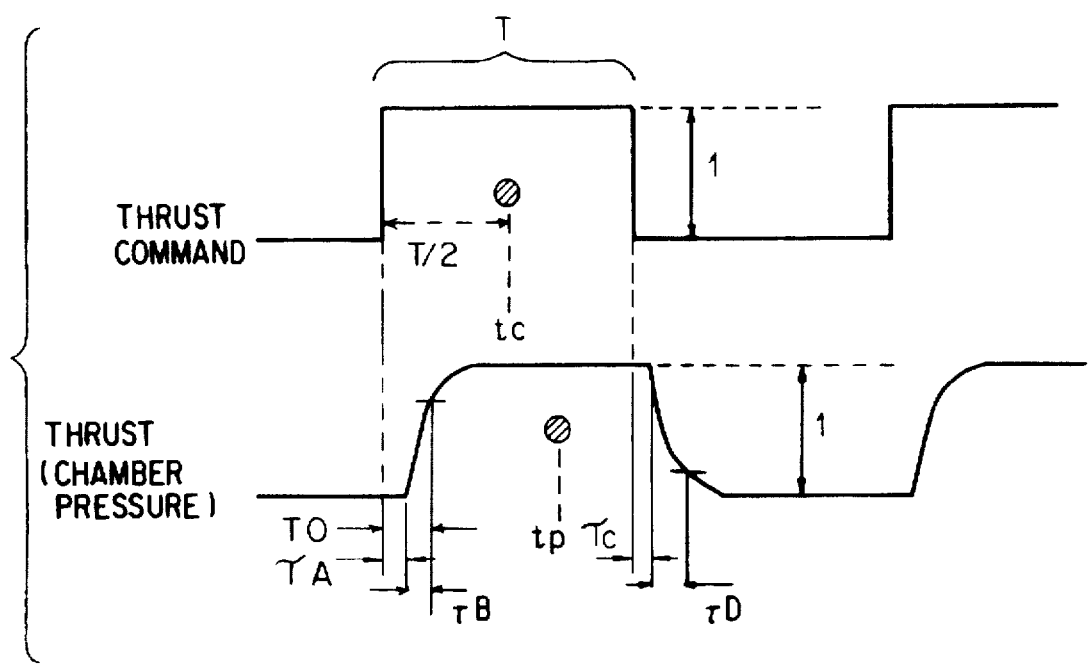
F I G. 1
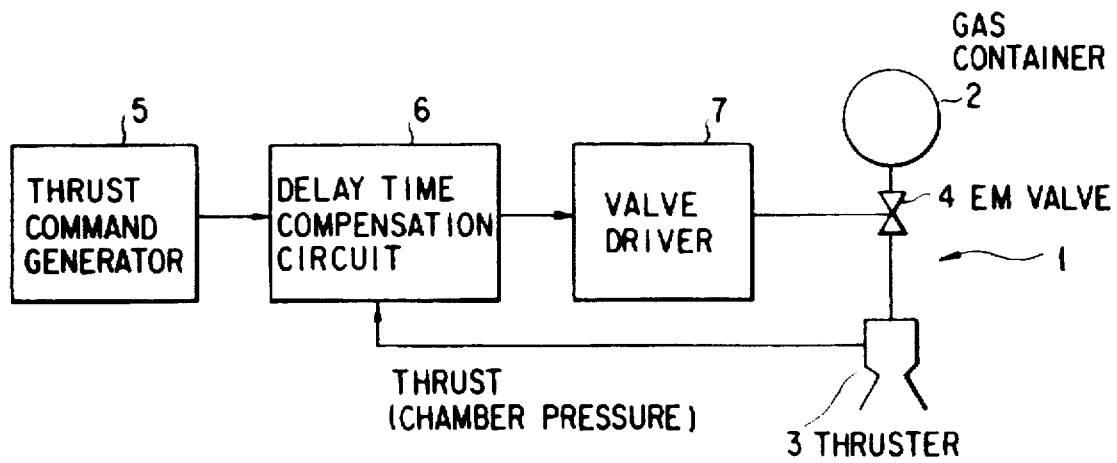
F I G. 2

APPARATUS AND METHOD FOR CONTROLLING THRUSTER VALVE

BACKGROUND OF THE INVENTION

1. Field of the Invention

The present invention relates to an apparatus and a method for controlling a thruster valve serving as a control actuator provided for a gas jet mechanism for use in controlling the attitude or a spin axis of an artificial satellite or a flying object.

2. Description of the Related Art

The attitude of, for example, a penetrator and a communication satellite in an inertial space has been controlled by spin axis control. The spin axis control is performed by a gas jet mechanism having a gas tank filled with gas, a thruster unit and an electromagnetic valve disposed in a gas passage establishing the connection between the gas tank and the thruster unit, the electromagnetic valve being provided to serve as a control actuator. The gas can be a certain liquid fuel pressurized here.

When the electromagnetic valve of the gas jet mechanism is operated, the control system frequently requires the electromagnetic valve to be operated precisely in time. However, the electromagnetic valve suffers from a problem in that the time required to be opened and closed unintentionally changes due to various conditions, such as the original pressure in the gas tank, the temperature and the power supply voltage. Thus, the predetermined characteristics of the control system cannot easily be maintained.

In a case where a mechanism having light weight and simple structure is required as has been required when employed in a penetrator or the like, a so-called Blow-Down system is usually employed from which a heavy pressure-regulating valve for regulating the original pressure in the gas tank is omitted and in which change in the original pressure is permitted and positively used.

However, the Blow-Down system employed to operate the electromagnetic valve cannot satisfy an assumption that the delay in the operation is always constant. Thus, influence of this causes the controlling performance to be dispersed and errors to take place.

To satisfy a general requirement for minimizing the delay of the actuator for the purpose of improving the controlling performance, it is preferable that a high-speed electromagnetic valve be employed. However, a high speed and large flow rate valve cannot easily be obtained in the present circumstance.

SUMMARY OF THE INVENTION

In view of the foregoing, an object of the present invention is to provide an apparatus and a method for controlling a thruster valve capable of compensating delay of the operation of the thruster valve occurring due to the original pressure, the temperature and the like even if the thruster valve is operated by a Blow-Down method.

The present invention is established on the basis of the following principle. In a case of a subject of the control, the degree of the delay time of which does not always raise a problem, permission of change in the delay time results in compensation of change in the delay time of the thrust start being enabled. Moreover, substantially all subjects of control are required to prevent change, that is, variation of the delay time rather than the delay time itself. A gas jet mechanism involves that delay in each operation is not taken place randomly but the same takes place moderately. Therefore, delay times among successive thrust operations are substantially the same. Thus, if the delay time in the previous thrust is detected, delay time in a next operation can accurately be controlled.

According to the present invention, there is provided an apparatus for controlling a thruster valve disposed in a fluid passage between a gas tank filled with gas and a thruster unit for jetting gas filled in the gas tank, comprising means for measuring rise time of thrust, which responds to a certain thrust command, based on a state of operation of the thruster valve; means for comparing the rise time measured by the measuring means with a predetermined reference time to detect delay regulation time with respect to a certain thrust command; and means for issuing a drive control command to the thruster valve after the delay regulation time obtained by the delay time detection means has elapsed from supply of a next thrust command.

According to the present invention, there is provided a method for controlling a thruster valve disposed in a fluid passage between a gas tank filled with gas and a thruster unit for jetting gas filled in the gas tank, comprising the following steps of measuring rise time of thrust, which responds to a certain thrust command, based on a state of operation of the thruster valve; detecting delay regulation time with respect to a certain thrust command by comparing the measured rise time with a predetermined reference time; and issuing a drive control command to the thruster valve after the delay regulation time in response to the certain thrust command has elapsed from supply of a next thrust command.

Therefore, a necessity of considering compensation of each delay whenever a control command is issued can be eliminated. Since a command onto which the previous delay time has been reflected and which has been thus corrected is automatically issued, delay of the thruster valve can be compensated without enlargement of the overall weight due to employment of a pressure-regulating valve or the like. Since variation of delays is controlled, even a thruster valve, which is not a high speed operation valve, is enabled to realize an excellent control accuracy.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a timing chart for explaining the principle of the present invention by showing thrust commands and the generated thrusts;

FIG. 2 is a block diagram showing an embodiment of a method and an apparatus for controlling a thruster valve according to the present invention;

DETAILED DESCRIPTION OF THE PREFERRED EMBODIMENTS

Figure 3:
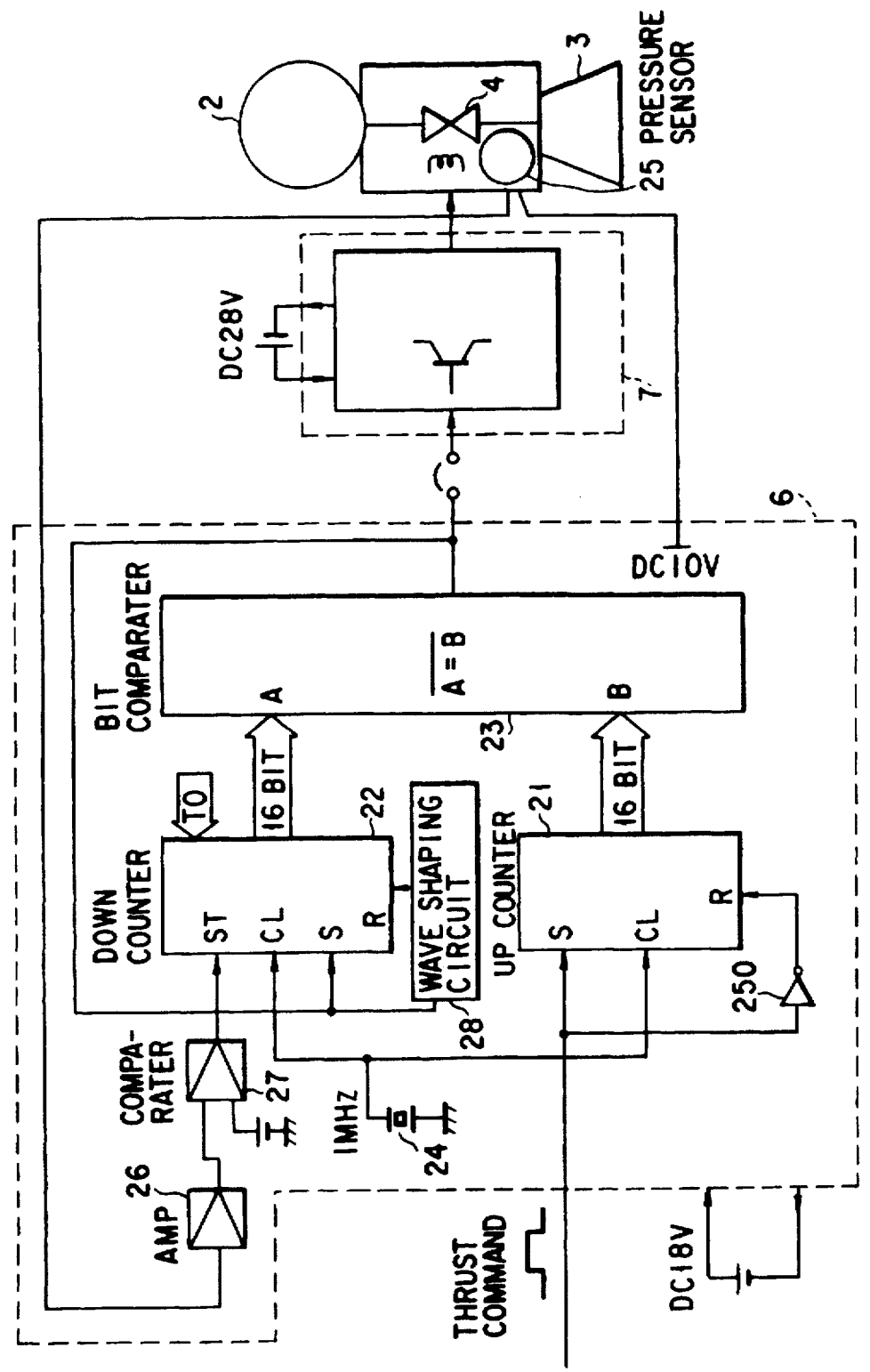
FIG. 3 is a circuit diagram showing a detailed structure of a delay time compensation circuit according to the embodiment.

A preferred embodiment of a thruster valve controlling apparatus according to the present invention will now be described with reference to the accompanying drawings.

First, the principle of the present invention will now be described with reference to FIG. 1. FIG. 1 schematically shows a general response waveform of thrust (chamber pressure) with respect to commands to open/close (thrust commands) an electromagnetic valve. As shown in FIG. 1, great correlation having a sensitivity of 1 is held between the rise time $\tau B$ and the fall time $\tau D$ (a relationship is held in which the length of the rise time and that of the fall time, substantially one-to-one, correspond to each other) of the thrust in response to the thrust commands. Therefore, it is not necessary to measure the fall time if the rise time is known. Delay time $\tau A+\tau B$ ($=T0$) obtained by adding idle time $\tau A$ to the rise time $\tau B$ corresponds to the position of the thrust curve when the thrust has reached a substantially steady value after the electromagnetic valve has been commanded open. Therefore, a control function can be realized which is capable for controlling a centroid of the thrust, delay by controlling the delay time between when thrust is commanded and substantially steady thrust is achieved.

As a specific applicable example, description will be performed about control of the direction of the spin axis of a satellite or a flying object in a state where it is being spun. Since the control of the spin axis direction is required to supply a pulse, having a predetermined width, at each spin in a predetermined direction in an inertial space, employment of thrust employing a Blow-Down method is planned frequently.

Although the delay time occurring in the thrust operation can be prevented by contriving the configuration of an electromagnetic valve and sensors for detecting the attitude around the spin axis, an important fact for improving the control characteristics is to control variation of the delay time. Strictly, deviation of centroid of the thrust waveform with respect to time is required to be controlled as compared with the control of the delay time.

Accordingly, the present invention employs a basic procedure comprising the steps of:

measuring time required, in one thrust operation, from a thrust command to the rise of the thrust;

providing artificial delay time to adjust the delay; and controlling time, at which a next thrust command is issued, in accordance with the delay time, so that the thrust centroid position is strictly controlled.

An embodiment of the present invention established on the basis of the foregoing principle will now be described with reference to FIGS. 2 to 4.

FIG. 2 is a block diagram showing a unit for controlling the electromagnetic valve of a gas jet mechanism employing the Blow-Down method. A gas jet mechanism 1 comprises a gas tank 2 filled with gas, a thruster unit 3 and an electromagnetic valve 4 disposed in a gas passage for establishing the connection between the gas tank 2 and the thruster unit 3 so as to serve as a control actuator.

A control system is connected to the gas jet mechanism 1, the control system comprising a thrust command generator 5 for transmitting a pulse, having a predetermined width and serving as a thrust command, at each spin of a satellite or a flying object in a predetermined direction in an inertial space; a delay time compensation circuit 6 for issuing a control command, which has been corrected by reflecting the previous delay time, whenever the thrust command is issued from the thrust command generator 5; and a valve driver 7 arranged to be operated to follow the control command supplied from the delay time compensation circuit 6 to open/close the electromagnetic valve 4. The delay time compensation circuit 6 receives a signal representing detected pressure of gas which has been jetted from the gas jet mechanism 1.

FIG. 3 is a circuit diagram showing the detailed structure of the delay time compensation circuit 6. The delay time compensation circuit 6 includes a pulse-width control circuit comprising an up-counter 21, a down-counter 22 and a bit comparator 23. The up-counter 21 counts clock signals (1 MHz) supplied from an oscillator 24 to a clock terminal CL thereof when the thrust command having a predetermined width has been received by a start terminal S thereof. Then, the up-counter 21 supplies a result of the count to the bit comparator 23, the up-counter 21 being reset when an inverted thrust command issued by an invertor 250, when the thrust command has been interrupted, has been received by a reset terminal R thereof. The down-counter 22 has initial value T0 set to correspond to the delay time for adjusting the delay time of the rise of the thrust at a certain point of time. When a valve drive pulse, to be supplied from the bit comparator 23 to the valve driver 7, has been received by the start terminal S thereof, the down-counter 22 decreases the count from the set value T0 whenever a clock signal is supplied from the oscillator 24 to a clock terminal CL thereof.

On the other hand, when the thrust level detected by a very small-pressure sensor 25 disposed in a small chamber formed at an end of the electromagnetic valve 4 of the gas jet mechanism 1 adjacent to the gas jet portion has been communicated to a comparator 27 through an amplifier 26 so as to be compared with a reference value and a signal, to be transmitted from the comparator 27 when the detected pressure exceeds the reference value, has been supplied to a stop terminal ST, the down-counter 22 maintains the value.

The bit comparator 23 compares the count supplied from the up-counter 21 and the count supplied from the down-counter 22 with each other. When the two counts have been made to be the same, the bit comparator 23 issues a control command to the valve driver 7, the control command being as well supplied to the start terminal S of the down-counter 22 and, through the wave shaping circuit 28, to the reset terminal R.

When the control command has been supplied from the bit comparator 23 to the valve driver 7, the valve driver 7 supplies, to the electromagnetic valve 4, a valve drive pulse having a predetermined width.

The operation of this embodiment having the foregoing structure will now be described with reference to FIG. 4 which is a timing chart of the delay control operation to be performed by the delay time compensation circuit 6.

Figure 4:
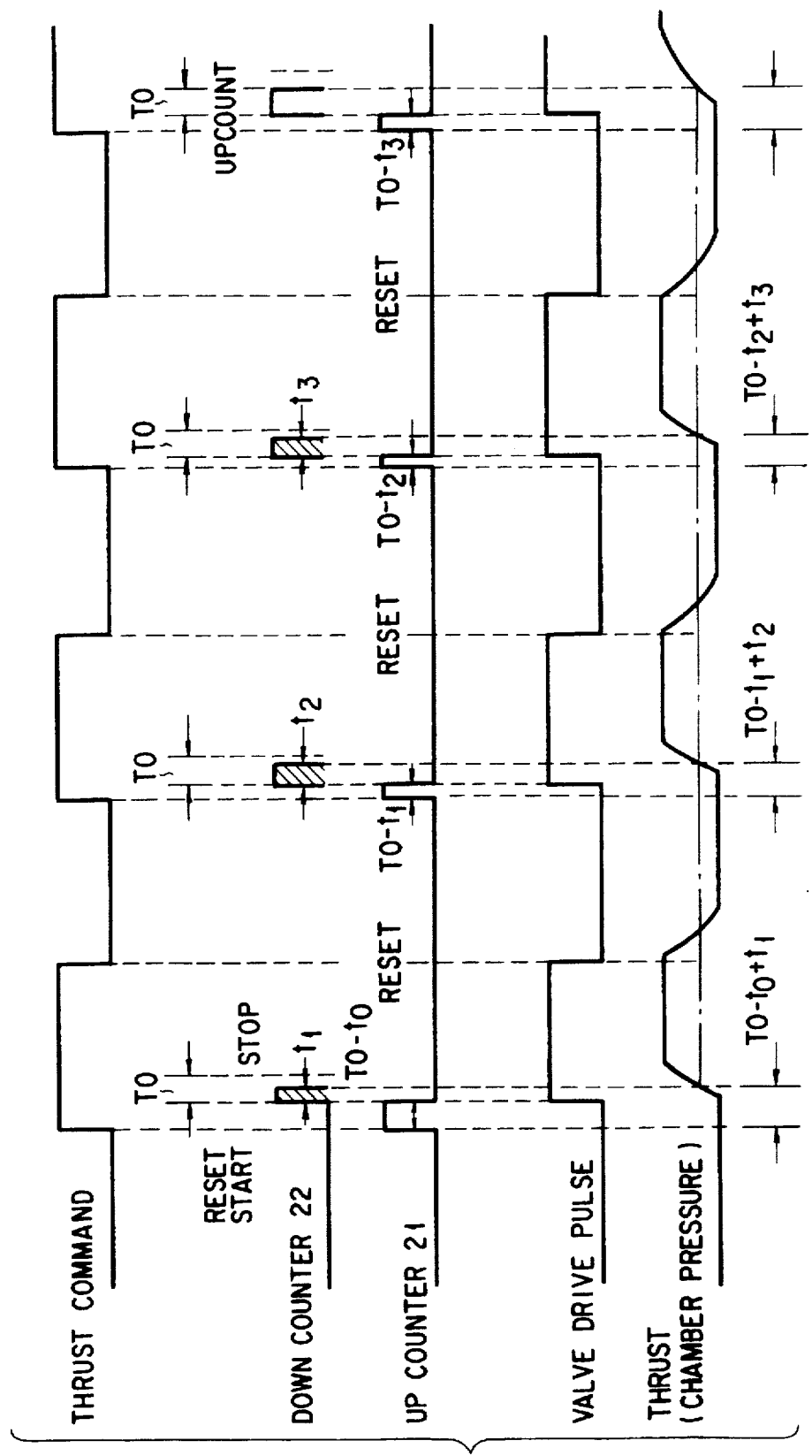
FIG. 4 is a timing chart showing the operation of the delay time compensation circuit.

FIG. 4 shows thrust commands, counts supplied from the down-counter 22 to an input terminal A of the bit comparator 23, counts supplied from the up-counter 21 to an input terminal B of the bit comparator 23, drive pulses to be supplied from the valve driver 7 to the electromagnetic valve 4 to follow the control command which is issued when A=B has been satisfied in the bit comparator 23, and thrust (chamber pressure) realized due to the operation of the electromagnetic valve 4.

As can be understood from the timing chart above, in the first thrust operation, sum T0–t0+t1 of time T0–t0, from the supply of the thrust command to the operation of the electromagnetic valve 4 in response to the valve drive pulse, and time t1 from the operation point of the electromagnetic valve 4 to a moment at which the thrust exceeds a threshold (which is detected by the comparator 23) is time taken for the delay of rise time of the thrust to be the centroid of the area obtained by integrating the thrust with respect to the time. Note that t0 is an initial value.

In the next thrust operation, sum T0–t1+t2 of time taken for the electromagnetic valve to be operated by delaying the valve drive pulse by residual time T0–t1 from the previous set value T0 and time t2 for which the thrust exceeds the threshold is the centroid of the area obtained by integrating the thrust with respect to the time. Similarly, in the next thrust operation, sum T0–t2+t3 of time taken for the electromagnetic valve to be operated by delaying the valve drive pulse by residual time T0–t2 from the previous set value T0 and time t3 for which the thrust exceeds the threshold is the centroid of the area obtained by integrating the thrust with respect to the time.

As described above, according to this embodiment, the delay time compensation circuit 6, at each spin, controls the delay time in accordance with the previous delay time. Thus, the thrust centroid position can precisely be controlled. Therefore, delay of the electromagnetic valve employing the Blow-Down method having no pressure-regulating valve can be compensated. Moreover, variation of the delay can be prevented and, thus, excellent control accuracy can be realized.

Although the foregoing embodiment has the structure such that the means for measuring rise delay time of the thrust is the very small pressure sensor which detects the thrust and which is disposed in the small chamber at the end of the electromagnetic valve 4, the means for measuring the rise delay time of the thrust is not limited to the pressure sensor. Another measuring means may be employed of a type, for example, which measures rise delay time in accordance with the waveform of an electric current for directly operating the electromagnetic valve.

Figure 5:
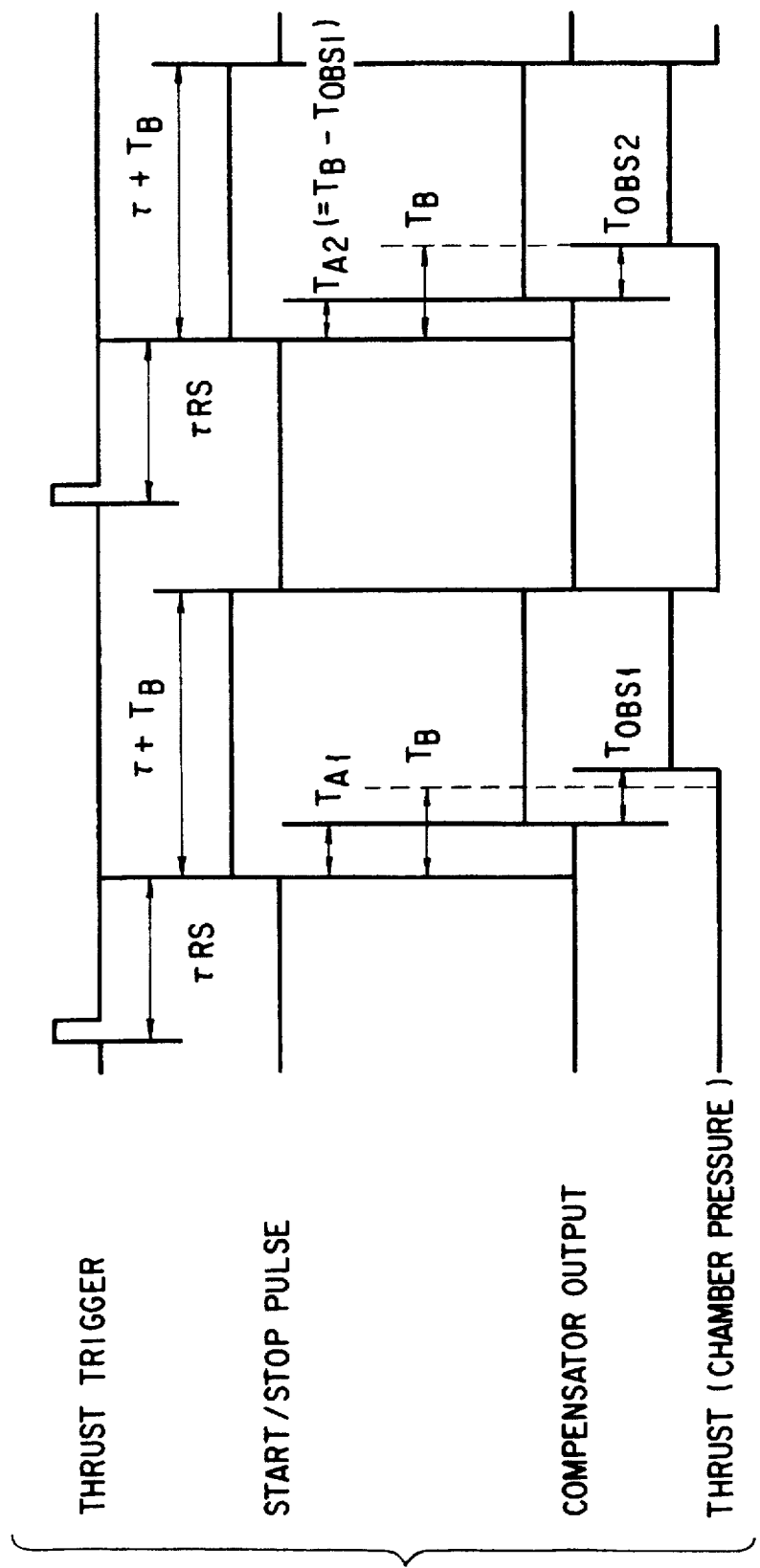
FIG. 5 is a timing chart of an operation for compensating delay time for explaining a practical example employed in LUNAR-A penetrator.

Other embodiments of the present invention will now be described. As a second embodiment, the operation for compensating the delay time which is employed in LUNAR-A Plan, which is a further practical example employed here, will now be described with reference to a timing chart shown in FIG. 5. FIG. 5 shows a thrust trigger and a start/stop pulse which are generated from the thrust command generator 5, a compensator output of the compensation circuit 6, and a thrust detected by the sensor 25.

The timing chart employs a logic with which the direction of the spin axis is changed by a so-called Rhumb Line control method and which is capable of simultaneously controlling the time width of the thrust pulse width.

Referring to FIG. 5, symbol TB represents required delay time and τ represents required thrust time. Timing of the thrust command at each operation is determined by using TOBS which is a value obtained by measuring the rise delay time shown in FIG. 5. The logic is explained with the delay time and the thrust width as follows:

τ RS+TA$_i$+TOBS$_i$=τ RS+TB+(TOBS$_i$–TOBS$_{i-1}$) is equivalent to τ RS+TB.

τ+TB–(TA$_i$+TOBS$_i$)=τ–(TOBS$_i$–TOBS$_{i-1}$) is equivalent to τ. The compensation circuit 6 set TA$_i$=TB–TOBS$_{i-1}$ on the assumption that the delay time is constant, i.e., TOBS$_i$=TOBS$_{i-1}$.

In the foregoing equations, if an assumption that "TOBSi is equivalent to TOBSi–1", which is an assumption that the delay transits moderately in the period of control which is the subject of the discussion, is right, it can be proved that a time τ RS+TB from the trigger to the thrust rise time and thrust pulse width τ can be controlled.

A processing algorithm for use in the case shown in FIG. 5 is as follows:

(1) At the i-th thrust, the thrust command is issued from the compensation circuit 6 after TA$_i$ from the rise of the thrust start/end pulse.

(2) Time TOBS$_i$ from the thrust command to a moment at which the output from the thrust sensor exceeds the reference value is measured.

(3) The valve is closed at a moment calculated by adding required delay time TB to the predetermined thrust width τ from the rise of the thrust start/end pulse.

(4) The operation returns to (1) as TA$_{i+1}$=TB–TOBS$_i$.

Although also the valve is closed with a delay in actual, the delay does not take place considerably with respect to various environmental conditions. Therefore, the delay time is omitted from the illustration.

The foregoing control method enables an assumed value of the delay time obtained by a previous measurement or the like to be set as the initial value. The foregoing value corresponds to the initial value of TA$_1$ shown in FIG. 5. However, the method according to this embodiment has the structure such that automatic adjustment is performed when the second and ensuing thrust operations are performed. Thus, the necessity of employing the assumed delay time can be eliminated to control the operation of the electromagnetic valve with the output for compensating the delay.

As described above, according to the present invention, delay of the valve can be compensated without a heavy and large pressure-regulating valve which regulates the pressure in the gas tank. Moreover, variation of the delay can be controlled. As a result, a method and an apparatus for controlling a thruster valve can be provided which is capable of realizing excellent control accuracy even with a thruster valve.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although the present invention is particularly advantageous when adapted to the Blow-Down electromagnetic valve, the present invention can be adapted to a structure having a pressure-regulating mechanism. The present invention is able to compensate the delay, such as change in the power supply voltage and the operation temperature, which cannot satisfactorily be compensated by the pressure-regulating mechanism. A so-called chemical reaction type thrust mechanism has a problem in that the position of the thrust centroid varies considerably in the initial state of the repeated operations. Also in this case, employment of the present invention enables the control accuracy to be improved.

What is claimed is:

1. An apparatus for controlling a thruster valve disposed in a fluid passage between a gas tank filled with gas and a thruster unit for jetting gas filled in the gas tank, comprising:

means for measuring rise time of thrust, which responds to a certain thrust command, based on a state of operation of said thruster valve;

means for comparing the rise time measured by said measuring means with a predetermined reference time to detect delay regulation time with respect to a certain thrust command; and means for issuing a drive control command to said thruster valve after the delay regulation time obtained by said delay time detection means has elapsed from supply of a next thrust command.

2. A control apparatus according to claim 1, wherein said measuring means comprises a pressure sensor disposed in a small chamber formed at an end of the thruster valve.

3. A method for controlling a thruster valve disposed in a fluid passage between a gas tank filled with gas and a thruster unit for jetting gas filled in the gas tank, comprising the following steps of:

measuring rise time of thrust, which responds to a certain thrust command, based on a state of operation of said thruster valve;

detecting delay regulation time with respect to a certain thrust command by comparing the measured rise time with a predetermined reference time; and issuing a drive control command to said thruster valve after the delay regulation time in response to the certain thrust command has elapsed from supply of a next thrust command.

* * * * *